(12) United States Patent
Ban et al.

(10) Patent No.: US 8,117,080 B1
(45) Date of Patent: Feb. 14, 2012

(54) POOLING METHOD FOR AUCTION OR RAFFLE IN A SOCIAL NETWORK SYSTEM

(76) Inventors: Sung Wan Ban, Tujunga, CA (US); Yun Hee Kim, Tujunga, CA (US)

( * ) Notice: Subject to any disclaimer, the term of this patent is extended or adjusted under 35 U.S.C. 154(b) by 0 days.

(21) Appl. No.: 13/083,902

(22) Filed: Apr. 11, 2011

(51) Int. Cl.
*G06Q 30/00* (2006.01)

(52) U.S. Cl. ...................................... 705/26.1

(58) Field of Classification Search ............... 705/26.3, 705/26.1, 37
See application file for complete search history.

(56) References Cited

U.S. PATENT DOCUMENTS 7,584,123 B1 * 9/2009 Karonis et al. ............... 705/26.3
2011/0071953 A1 * 3/2011 Shen et al. ................... 705/319

OTHER PUBLICATIONS

Strategic Herding Behavior in Peer-to-Peer Loan Auctions Michal Herzenstein, Utpal M Dholakia, Rick L Andrews; Journal of Interactive Marketing. Hoboken: Feb. 2011. vol. 25, Iss. 1; p. 27; http://proquest.umi.com/pqdweb?did=2280349451&sid=4&Fmt=2&clientId=19649&RQT=309&VName=PQD.*

* cited by examiner

*Primary Examiner* — Mila Airapetian
(74) *Attorney, Agent, or Firm* — John K. Park; Park Law Firm

(57) ABSTRACT

This invention relates to a pooling method for an auction existing in a social network system wherein bidding back-up friends who provided the best bidder or raffle winner with bidding money, bidding ticket, or raffle ticket are compensated. The compensation is proportional to the amount of bidding money provided, and the order of the winner and the bidding back-up friend. The pooling method for an auction bid in a social network system comprises the steps of: providing users with bidding money, building a bidding back-up friendship among the users, providing the users with bidding tickets, providing one user's bidding money or bidding ticket to his bidding back-up friend who participates in an auction, and best bidder wins the auction and his bidding back-up friends are compensated.

20 Claims, 2 Drawing Sheets

POOLING METHOD FOR AUCTION OR RAFFLE IN A SOCIAL NETWORK SYSTEM

BACKGROUND OF THE INVENTION

The present invention relates to a pooling method for an auction or raffle in a social network system. More particularly, this invention relates to a pooling method for an auction or a raffle in a social network system by building a bidding back-up friendship in the social network system wherein bidding back-up friends can provide bidding money to another member in their social network for an auction bid or a raffle contest.

There are a number of inventions for the pooling method for an auction bid or a raffle contest, which permits individual bidders to pool together funds during a bidding session. Some methods even suggest an auction held in an on-line network. However, recent rapid development of social network systems is changing the landscape for everything from how to interact with people, to how to place an advertisement, to how to do business. But, methods for holding an auction or a raffle contest are still limited to the traditional way and fail to utilize the potential that exists in the social network systems.

Accordingly, a need for an auction bidding or raffling method in a social network system has been present for a long time considering the expansive demands in everyday life. This invention is directed to solve these problems and satisfy a long-felt need.

SUMMARY OF THE INVENTION

The present invention presents a pooling method for an auction bid or a raffle contest in a social network system that utilizes people's interaction and businesses' marketing strategies for advertisements in a social network system. Specifically, the present invention provides an online bidding social networking system which utilizes online bidding money that can be given and received amongst members within a participant's network. Bidding content is effectively and quickly communicated within new and existing network connections, and it is through the cooperation of those within a network that brings about a successful bid. By being the supporting backup member for a potentially successful bidder, in the case of when the bidder wins the bid, the supporting members receive compensations. Distant bidding buddy friends receive larger allocation of bidding money in order to encourage participation from friends who have distant connections to one's social network. Because the bidding model allows for distantly connected bidding back-up friends to participate, through this bidding method, there is a huge potential marketing opportunity as ads are viewed by an audience composed of active bidders and their network of backup supporting bidders.

Thus, an object of the invention is to provide a pooling method for an auction or a raffle in a social network system by building a bidding back-up friendship in the social network system wherein bidding back-up friends can provide bidding money to each other for an auction or a raffle.

Another object of the invention is to provide a pooling method for auction in a social network system comprising the steps of providing users with bidding money; building a bidding back-up friendship to enable providing bidding money and bidding tickets to each other; distributing bidding tickets to participate in an auction for a product or a raffle for a prize; after a bidding session begins, providing bidding money or bidding ticket to each other; and after the bidding session ends, best bidder or raffle winner receives the product or prize.

Still another object of the invention is to provide a pooling method for auction in a social network system wherein bidding back-up friends who provided the best bidder or raffle winner with bidding money, bidding ticket, or raffle ticket are compensated and the compensation is proportional to the amount of bidding money provided and the order of the winner and the bidding back-up friend.

The advantages of the present invention are: (1) the present invention utilizes the potential of social networking system for a place for an auction or raffle; (2) members of a social network system are more motivated to support friends for or participate in an auction; and (3) the present invention gives companies an opportunity to market their products through advertisements and sell their goods in social networking systems.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will be better understood with reference to the accompanying drawings, wherein.

DETAILED DESCRIPTION EMBODIMENTS OF THE INVENTION

Figure 1:
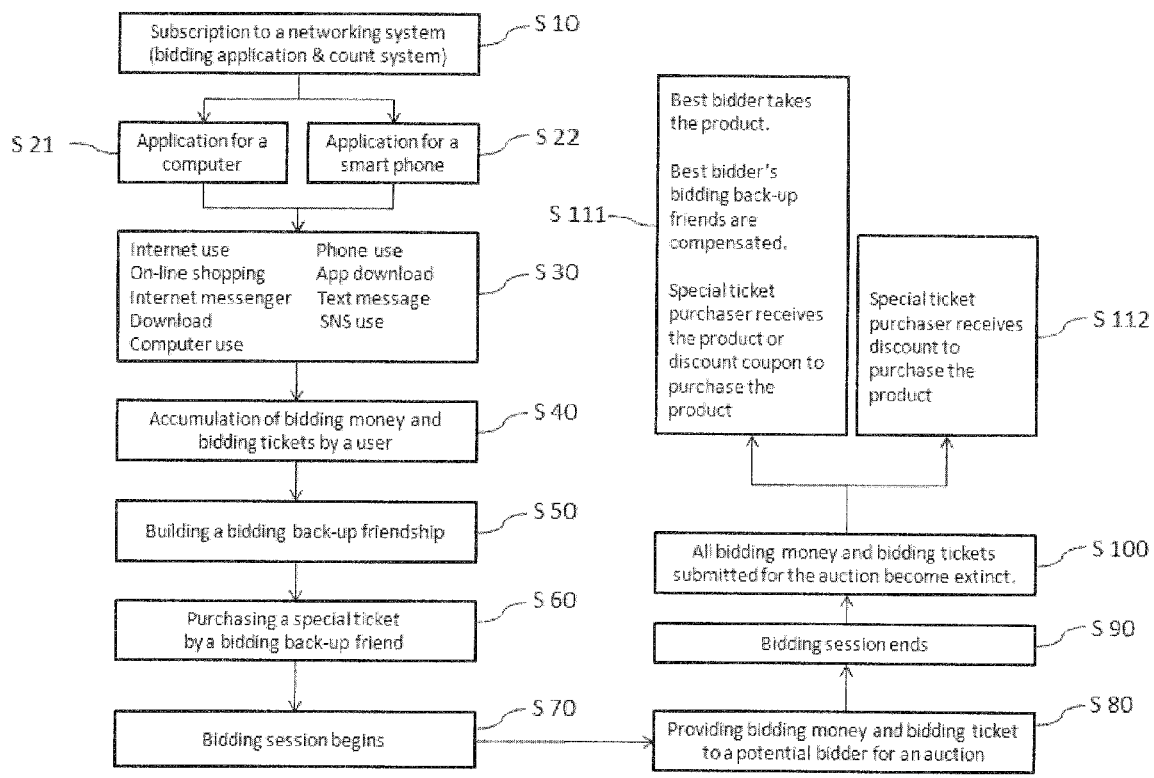
FIG. 1 is a flow chart showing the bidding procedure of the invention.

FIG. 1 shows a flow chart showing the bidding procedure of the invention. First, users need to subscribe to a networking system that has an on-line bidding or raffle platform S 10. Alternatively, this networking system may function in an existing social networking system such as Facebook or Twitter. A user may download and install the networking system, and the networking system includes a bidding platform for an auction or raffle S 21, S 22 on a computer or a smart phone. Alternatively, the bidding platform may be embedded in an existing social networking system.

Members of the networking system can do internet searching, on-line shopping, chat online, other computer uses, making a telephone call, downloading applications, text messages, social networking, or other computer use S 30. Bidding money, a type of on-line currency, is provided to the members as they use the networking system, and the bidding money provided may be proportional to the time or usage of the services provided by the networking system.

The social network system may provide a count system to measure the user's usage of the social network system where his specific activities such as internet searching, on-line shopping, application downloading, etc. result in gaining bidding money.

Besides, bidding tickets to participate in an auction bid or raffle are distributed to users when they do a specific activity on the networking system. The tickets may be distributed by the system operator or an advertiser. An advertiser may distribute bidding tickets to a user who clicks on an advertisement email from the advertiser, visits the advertiser's designated website, subscribes to an advertisement of the advertiser, purchases bidding content advertised by the advertiser, or shares with other social network system friends the advertisement content such as the text, photo or video posted by the advertiser. There may be additional ways to distribute bidding tickets as part of product promotional efforts.

A member who has bidding money or a bidding ticket may give his bidding money or bidding ticket to a friend in his network who is interested in a certain auction or raffle. The potential bidder may request additional bidding money to his friends by posting a message, sending an email, or other ways. He is motivated to gather as much bidding money as possible to win the auction or increase his chances to winning the raffle prize. For the raffle, the chances of winning increases as the amount of bid money increases.

Thus, the pooling method of the present invention for an auction in a social network system comprises the steps of: providing users of the social network system with bidding money S 30, S 40; building a bidding back-up friendship S 50 among the users to enable friends to provide bidding money and bidding tickets among bidding back-up friends; providing the users with bidding tickets wherein the bidding ticket entitles its holder to participate in an auction for a bidding content S 40; after a bidding session begins S 70, transferring one user's bidding money or bidding ticket to his bidding back-up friend who is participating in an auction using the bidding ticket S 80; and after the bidding session ends S 90, best bidder wins the auction and takes the bidding content wherein the best bidder's bidding back-up friends who had provided the best bidder with bidding money or bidding ticket for the auction are compensated S 111.

After the bidding session ends, all bidding money and bidding tickets submitted for the auction become extinct S 100. Best bidder wins the auction and takes the bidding content whereas his bidding back-up friends are compensated, preferably, by bidding money. Their compensation increases as their relation to the best winner is more distant. The bidding content may be a product, a ticket for an event, and so forth.

Figure 2:
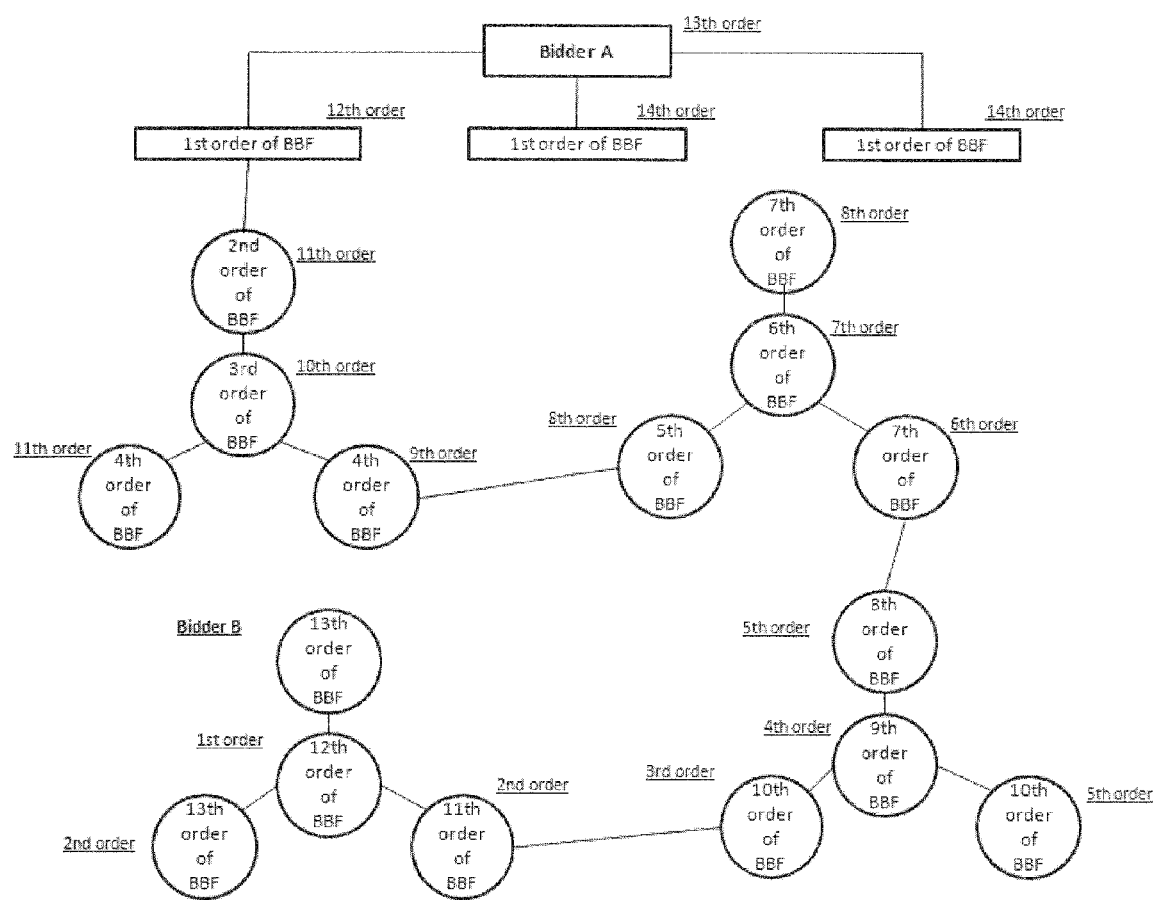
FIG. 2 is a diagram showing the order of bidding back-up friends.

Here, to calculate the amount of compensation for best bidder's bidding back-up friends, an order of the best bidder and a bidding back-up friend may be used. FIG. 2 shows a diagram to calculate the order of bidding back-up friends. As in FIG. 2, an order of two bidding back-up friends equals one plus the number of bidding back-up friends connecting the two bidding back-up friends. The best bidder's bidding back-up friend who provided the best bidder with bidding money or bidding ticket for the auction is compensated in accordance to the order of the best bidder and the bidding back-up friend.

Compensation to the best bidder's bidding back-up friend may increase as the order of the best bidder and the bidding back-up friend increases. Preferably, the compensation is bidding money, which is what the bidding back-up friend provided to the best bidder, multiplied by one plus the order of the best bidder and the bidding back-up friend. For instance, the fourth order of bidding back-up friend will be compensated 5 times the original bidding money that he provided to the winner.

Two bidding back-up friends may have more than one order between them and in this case, there needs to be a way to determine which order is to be used to calculate the compensation. One way is averaging all the orders and using the average for calculating the compensation. Another way is using the maximum or the minimum orders as the representative order for calculating the compensation. There may be other ways to determine the order for compensation.

There may be a limitation that allows bidding money and bidding tickets to be provided to only users who have at least two bidding back-up friends. This is to encourage member's activity in the networking system and to increase the advertising effect in their social network, which is greater when people have lots of friends.

For an auction or raffle, there may be an additional step of purchasing a special ticket. A bidding back-up friend who provides his bidding money or bidding ticket to a bidder is entitled to purchase a special ticket wherein the best bidder's bidding back-up friend who purchased the special ticket receives the bidding content or a discount coupon to purchase the bidding content S 60. Special tickets will promote sales of the bidding content.

For non-winning bidding back-up friends, a special ticket may be operated as a discount coupon. A non-winning special ticket purchaser receives a discount to purchase the bidding content S 112 wherein the best bidder's bidding back-up friend who purchases the special ticket is not entitled to the discount. Of course, winning special ticket purchaser will be compensated more than non-winning ones.

Besides, a new type of currency, called special money, may be used to obtain bidding tickets. A user receives special money when he shares email advertisement or advertisement content on the social network system or forwards by email or other electronic data interchange means. Additionally, if the user's friend re-shares or re-forwards the advertisements, not just the user's friend, but also the original user may receive additional special money. The special money can be used to purchase a special ticket.

Preferably, the user's usage will be classified into a passive use, an active use, and a participatory use in regards to an advertisement. Passive use means that a user's use of the Internet, smart phone or social network system is not related to an advertisement or there is no way to check whether he read an advertisement or not. For instance, simply browsing the Internet or social network system will be considered passive use. Active use means that a user is exposed to an advertisement and the exposure can be checked. For instance, clicking a hyperlink to an advertisement or subscribing to an advertisement will be considered active use. Furthermore, participatory use means that a user actively disseminates or distributes an advertisement. For instance, forwarding or sharing an advertisement will be considered participatory use. Compensation or reward depends on the type of use, whether it is passive, active, or participatory. Compensation for an active use will be greater than that for a passive use. In addition, compensation for a participatory use will be greater than that for an active use.

In one embodiment, bidding money is provided for a passive use whereas a bidding ticket or a special ticket is provided respectively for an active use or a participatory use.

The bidding session may play on the social network system and bidders and their bidding back-up friends are motivated to watch the play, providing additional arena or effect for advertisement.

For a raffle, the method is slightly different from that of an auction. A pooling method for a raffle in a social network system comprises the steps of providing users of the social network system with bidding money; building a bidding back-up friendship among the users that enables a transfer of bidding money and raffle tickets among bidding back-up friends; providing the users with raffle tickets wherein the raffle ticket entitles its holder to participate in a raffle for a prize; after a raffle session begins, providing one user's bidding money or raffle ticket to his bidding back-up friend who participates in the raffle using the raffle ticket; and after the raffle session ends, a raffle winner is selected and receives the prize wherein the raffle winner's bidding back-up friends who provided the raffle winner with bidding money or a raffle ticket for the raffle are compensated.

The chances of winning the raffle increase as the relation is more distant. Preferably, chance of winning the raffle is proportional to the bidding money supplied by a raffle participant. Here, the method for calculating the order of two bidding back-up friends is the same as that of an auction. Compensation to the raffle winner's bidding back-up friend increases as the order of the raffle winner and the bidding back-up friend increases and as bidding money supplied to the raffle winner increases.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A pooling method for auction, performed by a computer-implemented network for a social network system, comprising the steps of:
   providing users of the social network system with bidding money;
   building a bidding back-up friendship among the users to enable providing bidding money and bidding tickets among bidding back-up friends;
   providing the users with bidding tickets wherein the bidding ticket entitles its holder to participate in an auction for a bidding content;
   after a bidding session begins, providing one user's bidding money or bidding ticket to his bidding back-up friend who participates in an auction using the bidding ticket; and
   after the bidding session ends, best bidder's winning the auction and taking the bidding content through the computer-implemented network wherein the best bidder's bidding back-up friends who provided the best bidder with bidding money or bidding ticket for the auction are compensated.

2. The pooling method of claim 1, wherein after the bidding session ends, all bidding money and bidding tickets submitted for the auction become extinct.

3. The pooling method of claim 1, wherein the user downloads and installs the social network system on a computer or a smart phone wherein the social network system comprises a bidding application for the auction.

4. The pooling method of claim 3, wherein the social network system further comprises a count system to measure the user's usage of the social network system wherein bidding money provided to the user is proportional to the user's usage of the social network system.

5. The pooling method of claim 4, wherein the user's usage of the social network system includes internet search, on-line shopping, telephone call, downloading applications, internet messenger use, or text messaging.

6. The pooling method of claim 1, wherein bidding tickets are distributed by an advertiser to a user who check an advertisement email from the advertiser, accesses to the advertiser's designated website, subscribes to an advertisement of the advertiser, purchases a bidding content advertised by the advertiser, or shares with other social network system friends an advertisement material such as text, photo or video posted by the advertiser.

7. The pooling method of claim 6, wherein bidding money and bidding tickets are only provided to users who have at least two bidding back-up friends.

8. The pooling method of claim 1, wherein a bidding back-up friend who provides his bidding money or bidding ticket to a bidder is entitled to purchase a special ticket wherein the best bidder's bidding back-up friend with the special ticket receives the bidding content or a discount coupon to purchase the bidding content.

9. The pooling method of claim 8, wherein a special ticket purchaser receives a discount to purchase the bidding content wherein the best bidder's bidding back-up friend who purchases the special ticket is not entitled to the discount.

10. The pooling method of claim 8, wherein a user's use of a computer, Internet, or social network system is categorized into a passive use, an active use, and a participatory use; wherein the passive use means the user's use is not related to an advertisement, the active use means the user's use is exposed to the advertisement, and the participatory use means the user's use comprises distribution or dissemination of the advertisement; wherein compensation for an active use is greater than that for a passive use, and compensation for a participatory use is greater than that for an active use.

11. The pooling method of claim 1, further comprising the step of:
   calculating an order of two bidding back-up friends wherein the order is one plus the number of bidding back-up friends connecting the two bidding back-up friends; wherein the best bidder's bidding back-up friend who provided the best bidder with bidding money or bidding ticket for the auction are compensated according to the order of the best bidder and the bidding back-up friend.

12. The pooling method of claim 11, wherein compensation to the best bidder's bidding back-up friend increases as the order of the best bidder and the bidding back-up friend increases.

13. The pooling method of claim 12, wherein the bidding back-up friend's compensation is bidding money, which the bidding back-up friend provided to the best bidder, multiplied by one plus the order of the best bidder and the bidding back-up friend.

14. The pooling method of claim 11, wherein if there is more than one order of two bidding back-up friends, the order is determined by averaging all the orders.

15. The pooling method of claim 11, wherein if there is more than one order of two bidding back-up friends, maximum order of the orders is the order of the two bidding back-up friends.

16. The pooling method of claim 11, wherein if there is more than one order of two bidding back-up friends, minimum order of the orders is the order of the two bidding back-up friends.

17. A pooling method for raffle, performed by a computer-implemented network for a social network system, comprising the steps of:
   providing users of the social network system with bidding money;
   building a bidding back-up friendship among the users to enable providing bidding money and raffle tickets among bidding back-up friends;
   providing the users with raffle tickets wherein the raffle ticket entitles its holder to participate in a raffle for a prize;
   after a raffle session begins, providing one user's bidding money or raffle ticket to his bidding back-up friend who participates in the raffle using the raffle ticket; and
   after the raffle session ends, a raffle winner's being selected by the computer-implemented network and receiving the prize wherein the raffle winner's bidding back-up friends who provided the raffle winner with bidding money or raffle ticket for the raffle are compensated.

18. The pooling method of claim 17, wherein chance of winning the raffle is proportional to bidding money supplied by a raffle participant.

19. The pooling method of claim 17, further comprising the step of:

calculating an order of two bidding back-up friends wherein the order is one plus the number of bidding back-up friends connecting the two bidding back-up friends; wherein the raffle winner's bidding back-up friend who provided the best bidder with bidding money or raffle ticket for the raffle are compensated according to the order of the raffle winner and the bidding back-up friend.

20. The pooling method of claim 19, wherein compensation to the raffle winner's bidding back-up friend increases as the order of the raffle winner and the bidding back-up friend increases and as bidding money supplied to the raffle winner increases.

\* \* \* \* \*